US011247529B2

(12) United States Patent
Zhou et al.

(10) Patent No.: US 11,247,529 B2
(45) Date of Patent: Feb. 15, 2022

(54) SYSTEMS AND METHODS FOR PROVIDING HEATING AND COOLING TO A VEHICLE CABIN OF AUTONOMOUS VEHICLES

(71) Applicant: TOYOTA MOTOR ENGINEERING & MANUFACTURING NORTH AMERICA, INC., Plano, TX (US)

(72) Inventors: Feng Zhou, South Lyon, MI (US); Tianzhu Fan, Ann Arbor, MI (US); Shailesh N. Joshi, Ann Arbor, MI (US); Ercan Mehmet Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 223 days.

(21) Appl. No.: 16/728,503

(22) Filed: Dec. 27, 2019

(65) Prior Publication Data

US 2020/0148029 A1 May 14, 2020

Related U.S. Application Data

(63) Continuation of application No. 15/633,123, filed on Jun. 26, 2017, now Pat. No. 10,556,481.

(51) Int. Cl.
*B60H 1/00* (2006.01)
(52) U.S. Cl.
CPC ..... *B60H 1/00392* (2013.01); *B60H 1/00007* (2013.01); *B60H 1/00278* (2013.01);
(Continued)

(58) Field of Classification Search
None
See application file for complete search history.

(56) References Cited

U.S. PATENT DOCUMENTS

| 7,621,135 B2 | 11/2009 | Kadle et al. |
| 7,640,753 B2 | 1/2010 | Kadle et al. |

(Continued)

FOREIGN PATENT DOCUMENTS

| CN | 102019867 A | 4/2011 |
| CN | 102120412 A | 7/2011 |

(Continued)

OTHER PUBLICATIONS

Chinese Office Action cited in Chinese Application No. 201810642013.7 dated Oct. 28, 2020, 13 pages.

(Continued)

*Primary Examiner* — Todd Melton
(74) *Attorney, Agent, or Firm* — Dinsmore & Shohl, LLP

(57) ABSTRACT

Systems and methods for providing heating and cooling to a cabin of an autonomous or semiautonomous electric vehicle. A system includes one or more autonomous or semiautonomous electric vehicle components generating thermal energy as a byproduct of operation, a radiator fluidly coupled to the one or more vehicle components and positioned downstream from the one or more vehicle components such that the radiator receives at least a portion of the thermal energy, a thermoelectric cooler thermally coupled to and located downstream from the radiator, and one or more bypass valves that control fluid flow from the radiator such that fluid flows directly to a cabin of the vehicle or flows through the thermoelectric cooler before flowing into the cabin.

20 Claims, 14 Drawing Sheets

(52) U.S. Cl.
CPC ..... *B60H 1/00478* (2013.01); *B60H 1/00885* (2013.01); *B60H 1/00964* (2013.01); *B60H 2001/00307* (2013.01)

(56) References Cited

U.S. PATENT DOCUMENTS

| | | | |
|---|---|---|---|
| 7,779,639 | B2 | 8/2010 | Goenka |
| 7,789,176 | B2 | 9/2010 | Zhou |
| 7,870,892 | B2 | 1/2011 | Gawthrop |
| 7,966,835 | B2 | 6/2011 | Petrovski |
| 8,662,226 | B2 | 3/2014 | Varns et al. |
| 9,150,132 | B2 | 10/2015 | Hoke et al. |
| 9,327,732 | B1 | 5/2016 | Miller et al. |
| 9,862,244 | B2 | 1/2018 | Kim et al. |
| 10,589,596 | B2 * | 3/2020 | Riederer ............ B60H 1/00385 |
| 2008/0229759 | A1 | 9/2008 | Ouyang et al. |
| 2012/0079837 | A1 | 4/2012 | Maranville et al. |
| 2012/0291987 | A1 | 11/2012 | Himmer et al. |

FOREIGN PATENT DOCUMENTS

| | | |
|---|---|---|
| CN | 103303096 A | 9/2013 |
| CN | 104514602 A | 4/2015 |
| CN | 106183714 A | 12/2016 |
| CN | 106715857 A | 5/2017 |
| DE | 102009023175 A1 | 12/2010 |
| DE | 102013111398 A1 | 9/2014 |
| EP | 2596978 B1 | 3/2015 |
| JP | 2012250639 A | 12/2012 |
| KR | 20120094567 A | 8/2012 |

OTHER PUBLICATIONS

Alaoui et al., "A Novel Thermal Management for Electric and Hybrid Vehicles", IEEE Transactions on Vehicular Technology, Mar. 2005, pp. 468-476. (Year: 2005).

Yu et al., "Thermoelectric Automotive Waste Heat Energy Recovery Using Maximum Power Point Tracking", Energy Conversion and Management, vol. 50, Apr. 2009, pp. 1506-1512. (Year: 2009).

Campbell et al., "Analysis and Characterization of Thermoelectric Module and Heat Exchanger Performance in a Hybrid System Cooling Application", 27th IEEE Semiconductor Thermal Measurement and Management (SEMI-THERM) Symposium, Mar. 2011, pp. 48-53. (Year: 2011).

Orr et al., "A Review of Car Waste Heat Recovery Systems Utilising Thermoelectric Generators and Heat Pipes", Applied Thermal Engineering, May 25, 2016, pp. 490-495. (Year: 2016).

* cited by examiner

SYSTEMS AND METHODS FOR PROVIDING HEATING AND COOLING TO A VEHICLE CABIN OF AUTONOMOUS VEHICLES

CROSS-REFERENCE TO RELATED APPLICATION

This application is a continuation of and claims priority to U.S. patent application Ser. No. 15/633,123, filed Jun. 26, 2017 and entitled "SYSTEMS AND METHODS FOR PROVIDING HEATING AND COOLING TO A VEHICLE CABIN OF AUTONOMOUS VEHICLES," the entire contents of which is incorporated herein by reference.

TECHNICAL FIELD

Embodiments described herein generally relate to systems that utilized waste heat generated by vehicle components and, more specifically, to systems and methods that utilize waste heat generated by components that are specifically located in autonomous or semiautonomous vehicles.

BACKGROUND

Electric vehicles, particularly autonomous electric vehicles and semiautonomous electric vehicles, have various components that generate a significant amount of heat. Such components are generally not found in non-electric vehicles or are modified versions that do not present as much heat in non-electric vehicles.

Existing systems that are used to capture the thermal energy produced by electric vehicles and use it for various other functions such as a source for electrical energy generation, heating and/or cooling cabin components, or the like tend to use typical heat exchange components such as a heat exchanger, a heat sink, or the like. Moreover, such systems may further require a compressor or the like that is used to provide appropriate heating or cooling supply to the vehicle cabin. However, such components are bulky and inefficient, thereby drastically reducing the ability of an electric vehicle to be as efficient as possible. In addition, such components do not provide adequate thermal comfort to a person within the vehicle cabin (i.e., do not sufficiently heat and/or cool the vehicle cabin).

Accordingly, a need exists for vehicle components that are specifically positioned relative to heat generating devices and the vehicle cabin in an electric vehicle to efficiently utilize thermal energy from the heat generating devices to heat and/or cool the vehicle cabin.

SUMMARY

In an embodiment, a vehicle system includes one or more autonomous or semiautonomous vehicle components generating thermal energy as a byproduct of operation, a radiator fluidly coupled to the one or more vehicle components and positioned downstream from the one or more vehicle components such that the radiator receives at least a portion of the thermal energy, a thermoelectric cooler thermally coupled to and located downstream from the radiator, and one or more bypass valves that control fluid flow from the radiator such that fluid flows directly to a cabin of the vehicle or flows through the thermoelectric cooler before flowing into the cabin.

In another embodiment, a system in an autonomous or semiautonomous electric vehicle includes one or more autonomous or semiautonomous vehicle components generating thermal energy as a byproduct of operation, a radiator fluidly coupled to the one or more vehicle components and positioned downstream from the one or more vehicle components such that the radiator receives at least a portion of the thermal energy, a thermoelectric cooler thermally coupled to and positioned downstream from the radiator, a thermoelectric generator fluidly coupled to the radiator and positioned downstream from the radiator, the thermoelectric generator generating electrical energy from excess thermal energy delivered in the fluid from the radiator, an energy storage device electrically coupled to the one or more electric vehicle components, the thermoelectric cooler, and the thermoelectric generator, and one or more bypass valves that control fluid flow from the radiator such that fluid flows directly to a cabin of the vehicle or flows through the thermoelectric cooler before flowing into the cabin. The energy storage device stores the electrical energy generated by the thermoelectric generator and supplies the electrical energy to the one or more electric vehicle components and the thermoelectric cooler.

In yet another embodiment, an autonomous or semiautonomous electric vehicle includes a system. The system includes one or more autonomous or semiautonomous electric vehicle components generating thermal energy as a byproduct of operation, a radiator fluidly coupled to the one or more electric vehicle components and positioned downstream from the one or more electric vehicle components such that the radiator receives at least a portion of the thermal energy, a thermoelectric cooler thermally coupled to and positioned downstream from the radiator, and one or more bypass valves that control fluid flow from the radiator such that fluid flows directly to a cabin of the vehicle or flows through the thermoelectric cooler before flowing into the cabin.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing heating and cooling to the cabin of an electric vehicle, particularly an autonomous or semiautonomous electric vehicle. The systems and methods described herein incorporate a thermoelectric cooler downstream from various vehicle components such as a vehicle charger, an air conditioning system, and a radiator. Use of a thermoelectric cooler in such a manner allows for the systems and methods described herein to operate more efficiently by utilizing as much of the thermal energy generated as a byproduct of various vehicle components that are particularly found in autonomous and semiautonomous electric vehicles. The systems and methods for providing heating and cooling to the cabin of an electric vehicle that incorporate a thermoelectric cooler will be described in more detail hereinbelow.

As used herein, an "electric vehicle" refers to any vehicle that includes an electric motor as a source of power for vehicle propulsion. While an automobile is generally described herein, it should be understood that the present disclosure is not limited to such, and other vehicles are also included within the scope of the present disclosure. Illustrative examples of electric vehicles include, but are not limited to, electric-only electric vehicles (EVs), plug-in hybrid electric vehicles (PHEVs), extended range electric vehicles (EREVs), and the like. In some embodiments, the electric vehicle may be a hybrid vehicle that incorporates an internal combustion engine with an electric motor.

As used herein, "autonomous" and "semiautonomous" electric vehicles refer to electric vehicles that have at least one vehicle system that can control a driving aspect of the vehicle. Autonomous systems may be capable of operating entirely without human intervention, whereas semiautonomous systems may provide assistive capabilities to a human driver. Examples of semiautonomous systems include, but are not limited to, adaptive cruise control systems, parallel parking systems, reverse movement guidance systems, lane departure warning/control systems, collision avoidance systems, and the like. Autonomous and semiautonomous systems may utilize components that are not otherwise found in a conventional vehicle, such as particular graphics processing units (GPUs), autonomous drive motor systems, autonomous power electronics, or the like. Because running an autonomous or semiautonomous system requires a large amount of processing power, such systems may generate an excess amount of heat as the result of normal operation.

Figure 1:
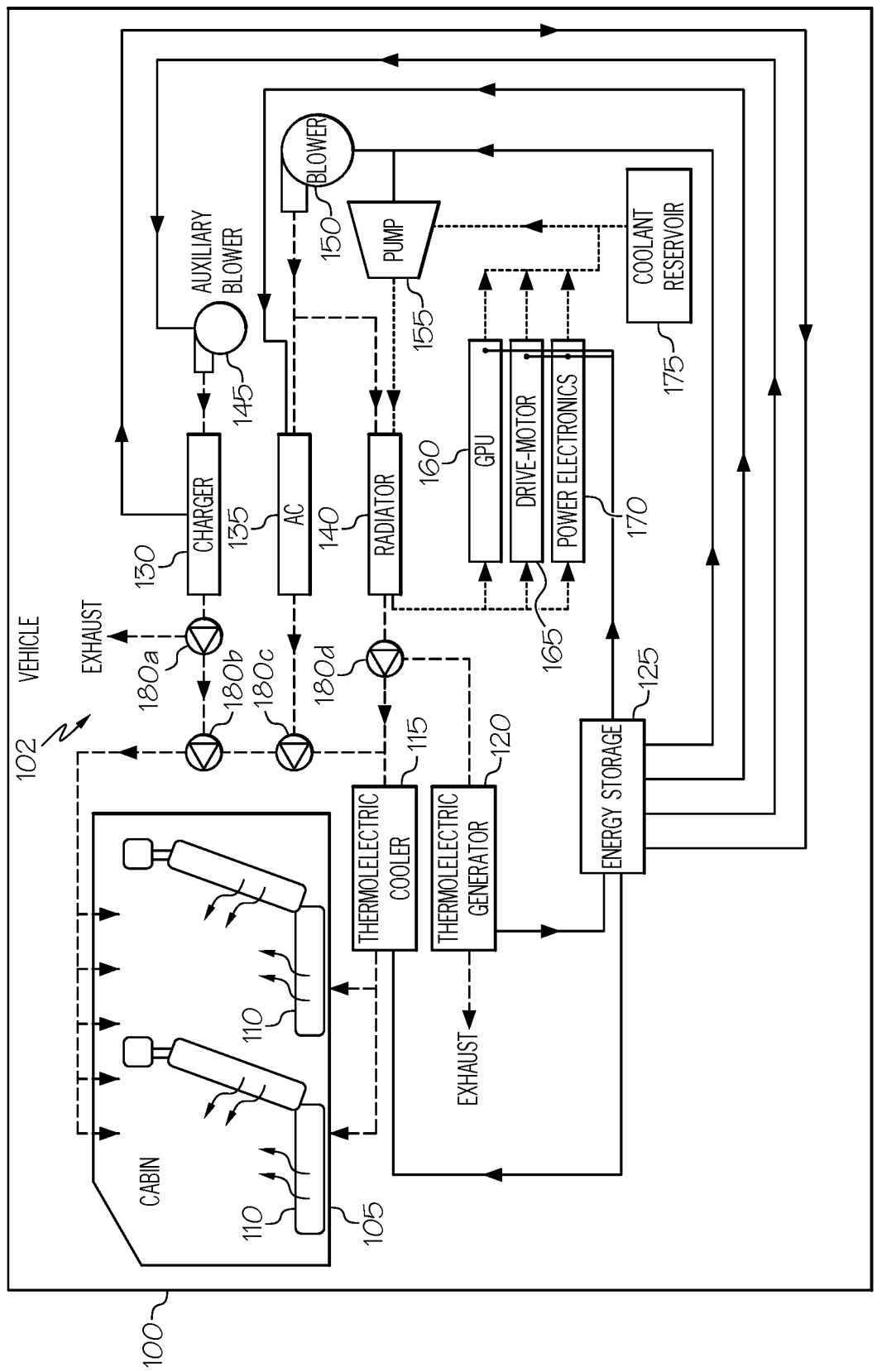
FIG. 1 schematically depicts an illustrative system for providing heating and cooling to a vehicle cabin of an autonomous or semiautonomous electric vehicle according to one or more embodiments shown and described herein.

Referring now to the drawings, FIG. 1 depicts an illustrative system, generally designated 102, within a vehicle 100 that provides heating and cooling to a vehicle cabin 105 of the vehicle 100. In some embodiments, the vehicle 100 may generally be any vehicle that incorporates one or more autonomous or semiautonomous systems therein, as described in greater detail herein. In other embodiments, the vehicle 100 may generally any vehicle that uses an electric motor or a hybrid propulsion system (e.g., an internal combustion system that comprises or is coupled to at least one electric motor). Any one of the examples of the vehicle 100 described above may contain heat generating components, and therefore, the vehicle 100 may be referred to as an electric vehicle, an autonomous vehicle, an autonomous electric vehicle, a semiautonomous vehicle, or a semiautonomous electric vehicle interchangeably herein.

Figure 2:
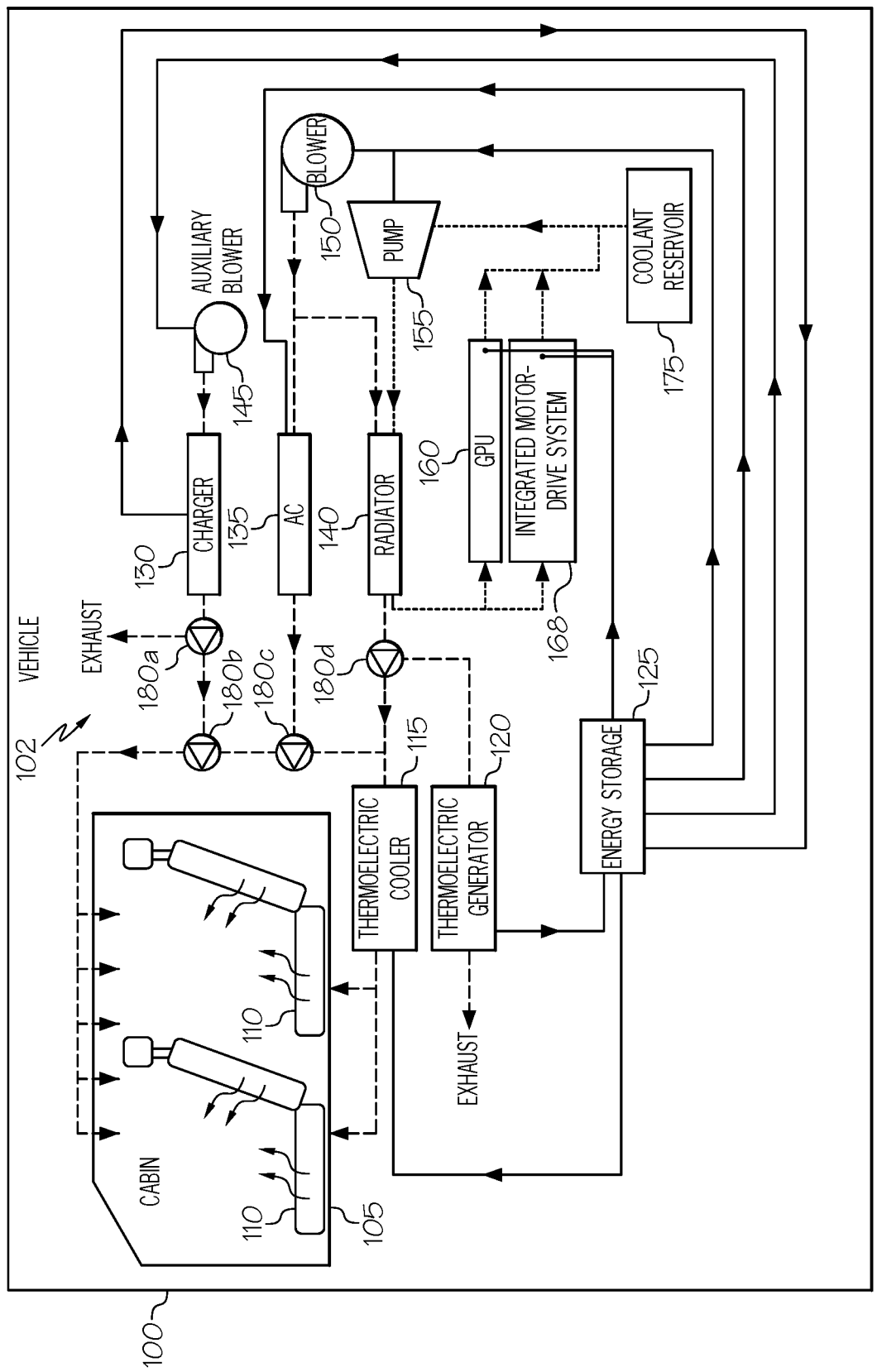
FIG. 2 schematically depicts another illustrative system for providing heating and cooling to a vehicle cabin of an autonomous or semiautonomous electric vehicle according to one or more embodiments shown and described herein.

The system 102 may include various vehicle components that provide heating or cooling functionality to the vehicle 100, components that generate thermal energy as a byproduct of their operation, and/or components that operate to exchange thermal energy and/or convert thermal energy to electrical energy. Illustrative components contained within the system 102 include, but are not limited to, a thermoelectric cooler 115, a thermoelectric generator 120, an energy storage device 125, a charger 130, an air conditioning system 135, a radiator 140, an auxiliary blower 145, a blower 150, a pump 155, an autonomous or semiautonomous system GPU 160, an electric drive motor 165, one or more electric vehicle power electronics modules 170, a coolant reservoir 175, and one or more bypass valves 180a-180d (collectively 180). In some embodiments, instead of an electric drive motor and one or more electric vehicle power electronics modules, the system 102 may include a combined integrated motor drive system 168, as depicted in FIG. 2.

Still referring to FIG. 1, the thermoelectric cooler 115, which may also be referred to as a Peltier device, a Peltier heat pump, or a solid state refrigerator, is generally a device that utilizes the Peltier effect to create a heat flux between the junction of two different types of materials and provide additional cooling to the fluid delivered to the vehicle cabin 105. More specifically, the thermoelectric cooler 115 includes a heat sink, a thermoelectric module, and/or the like that acts as a solid-state active heat pump to transfer heat from one side of the thermoelectric cooler 115 to the other with an input of electrical energy, which is provided, for example, by the energy storage device 125. The thermoelectric cooler 115 may include two unique semiconductor materials (an n-type and a p-type) that are placed thermally in parallel to each other and electrically in series, and then joined with a thermally conducting plate on each side. When a DC electric current is applied to the thermoelectric cooler 115, the thermoelectric cooler 115 brings heat from one side thereof to the other such that one side gets cooler while the other side gets hotter. The hot side is attached to a heat sink so that it remains at ambient temperature, while the cool side exhibits temperatures that are below ambient temperature. In some embodiments, the thermoelectric cooler 115 may include a plurality of coolers that are cascaded together to achieve lower temperatures than what would be possible with a single cooler.

The thermoelectric cooler 115 may be configured such that it receives fluid from one or more of the charger 130, the air conditioning system 135, and the radiator 140. The thermoelectric cooler 115 is also configured to cool the fluid before passing the fluid on to the vehicle cabin 105 and/or the seat heating or cooling components 110.

It should be understood that use of the thermoelectric cooler 115 to provide additional cooling of air supplied to the vehicle cabin 105 provides additional and/or improved thermal comfort to a person within the vehicle cabin 105, particularly in electric vehicles containing the various autonomous or semiautonomous components described herein.

The thermoelectric generator 120, which may also be referred to as a Seebeck generator, is generally a solid state device that converts heat flux directly into electrical energy using the Seebeck effect. As is generally understood, the thermoelectric generator 120 may include a plurality of thermoelectric materials, each of which has a different Seebeck coefficient (e.g., p-doped and n-doped semiconductor materials). Illustrative examples of suitable thermoelectric materials may include, but are not limited to, bismuth telluride ($Bi_2Te_3$), lead telluride (PbTe), and silicon germanium (SiGe), nanoparticles, nanowires, and the like.

The thermoelectric generator 120 may be configured such that it receives heated fluid from one or more devices (such as, for example, the radiator 140) and generates electricity therefrom. The electricity is delivered to one or more components electrically coupled thereto, such as, for example, the energy storage device 125.

The energy storage device 125 is any device that can receive electrical energy from one or more components, store electrical energy, and provide electrical energy to one or more components. An illustrative example of an energy storage device 125 is a battery, such as the one or more batteries that are typically found in vehicles, particularly electric vehicles.

The charger 130 is a device that generally provides electrical energy from an external source to the energy storage device 125. For example, the charger 130 may be a port that receives a connector from an EV charging stand or the like. In another example, the charger 130 may be an inductive plate that generates electricity. In yet another example, the charger 130 may be a device that generates electricity from another energy source, such as regenerative braking system or the like.

The charger 130 may generate thermal energy (heat) as a byproduct of electricity generation or reception of electricity, which can be used to heat the vehicle cabin 105 or may be exhausted when heated air is not needed, as described in greater detail herein. As such, in some embodiments, movement of the heated air from the charger 130 to the vehicle cabin 105 or an exhaust may be facilitated by the auxiliary blower 145, which is a fan, turbine, or the like. That is, the auxiliary blower 145, when operating, blows air from the charger 130 into a conduit that directs the air to the vehicle cabin 105 (which may optionally include routing through the thermoelectric cooler 115 by a third bypass valve 180c, as described in greater detail herein).

The air conditioning system 135 is generally a system that is commonly found in vehicles to provide cooling air to the vehicle cabin 105. As such, the air conditioning system 135 is not described in further detail herein. In some embodiments, movement of the cooled air from the air conditioning system 135 to the vehicle cabin 105 may be facilitated by the blower 150, which is a fan, turbine, or the like. That is, the blower 150, when operating, blows air from the air conditioning system 135 into conduit that directs the air to the vehicle cabin 105 (which may optionally include routing through the thermoelectric cooler 115 by a third bypass valve 180c, as described in greater detail herein).

The radiator 140 is generally a heat exchange device that is commonly found in vehicles to extract waste heat from a coolant carried from heat generating devices. For example, the radiator 140 may extract heat from coolant that is circulated from the autonomous or semiautonomous system GPU 160, the electric drive motor 165, and the one or more electric vehicle power electronics modules 170 (or alternatively, the integrated motor drive system 168 as described herein with respect to FIG. 2). As the function of the radiator 140 should generally be understood, it is not described in further detail herein. In some embodiments, movement of the heated air extracted by the radiator 140 to the vehicle cabin 105 may be facilitated by the blower 150. That is, the blower 150, when operating, blows air from the radiator 140 into conduit that directs the air to the vehicle cabin 105 (which may optionally include routing through the thermoelectric cooler 115 and/or the thermoelectric generator 120 by a fourth bypass valve 180d, as described in greater detail herein).

Coolant that is supplied to the radiator 140 may be delivered via the pump 155 from the coolant reservoir 175. That is, the pump 155 may pump the coolant from the coolant reservoir 175 and/or the components generating the excess heat to the radiator 140 for heat exchange, and then back to the coolant reservoir 175 and/or the components generating the excess heat to repeat the process, as described in greater detail herein.

The autonomous or semiautonomous system GPU 160 is a unit that manipulates and analyzes sensor data received from one or more sensors (e.g., autonomous vehicle cameras, LIDAR sensors, GPS sensors, or the like), generates command signals, and transmits the command signals to other vehicle components. That is, the autonomous or semi-autonomous system GPU 160 is a central unit that functions as the brain of the autonomous or semiautonomous vehicle that receives sensor data and directs control of the vehicle 100 based on the received sensor data. It should generally be understood that the autonomous or semiautonomous system GPU 160 requires a significant amount of processing power in order to complete the various processes necessary to autonomously or semiautonomously direct control of the vehicle 100, and a significant amount of thermal energy (heat) is generated as a result of that processing power. As such, to prevent damage to the autonomous or semiautonomous system GPU 160, the thermal energy is carried away from the autonomous or semiautonomous system GPU 160 by the coolant loop that exists between the coolant reservoir 175, the pump 155, the radiator 140 and the autonomous or semiautonomous system GPU 160, as described in greater detail herein.

The electric drive motor 165 generally refers to the one or more motors that are used to move the vehicle 100. That is, the electric drive motor 165 may be a central motor, a supplemental motor (e.g., a motor that is used in some hybrid combustion engine systems), or a plurality of motors (e.g., a motor mechanically coupled to each wheel of the vehicle 100 that controls wheel movement). Such motors should generally be understood and are not described in further detail herein. The electric drive motor 165 may generate thermal energy as a byproduct of operation. As such, to prevent damage to the electric drive motor 165, the thermal energy is carried away from the electric drive motor 165 by the coolant loop that exists between the coolant reservoir 175, the pump 155, the radiator 140, and the electric drive motor 165, as described in greater detail herein.

The power electronics modules 170 generally refer to the various electronics devices, systems, and modules that are typically included in electric vehicles for the operation thereof, particularly autonomous or semiautonomous electric vehicles. Such power electronics modules 170 may include, for example, control systems, sensor devices/sensing systems, energy generation systems, energy recycling systems, and/or the like. As such modules are generally understood, they are not described in further detail herein. The power electronics modules 170 may generate thermal energy as a byproduct of operation. As such, to prevent damage to the power electronics modules 170, the thermal energy is carried away from the power electronics modules 170 by the coolant loop that exists between the coolant reservoir 175, the pump 155, the radiator 140, and the power electronics modules 170, as described in greater detail herein.

Referring to FIG. 2, the integrated motor drive system 168 may generally incorporate features of the electric drive motor 165 and the power electronics module 170 described above with respect to FIG. 1. That is, the integrated motor drive system 168 may be a single device that functions in a manner similar to that of the electric drive motor 165 and the power electronics module 170 as described with respect to FIG. 1 above. Similar to such components, the integrated motor drive system 168 may generate thermal energy as a byproduct of operation. As such, to prevent damage to the integrated motor drive system 168, the thermal energy is carried away from the integrated motor drive system 168 by the coolant loop that exists between the coolant reservoir 175, the pump 155, the radiator 140, and the integrated motor drive system 168, as described in greater detail herein.

Referring again to FIG. 1, the vehicle cabin 105 may receive cooled and/or heated air through one or more air vents (not shown). In some embodiments, the vehicle cabin 105 may include one or more seat heating or cooling components 110. The seat heating or cooling components 110 may be configured to heat or cool the seats of the vehicle 100 to provide passenger comfort. For example, the seat heating or cooling components 110 may include one or more heating coils located in one or more vehicle seats and/or one or more air vents located in one or more vehicle seats. A heating coil may be supplied with an electrical current so as to generate thermal energy to heat the seats in which the coil is integrated. An air vent may be supplied with heated or cooled air as to provide the heated or cooled air to the seat in which the vent is integrated. While air vents and seat heating or cooling components 110 within the vehicle cabin 105 are specifically discussed herein, the present disclosure is not limited to such. That is, other cabin components that may provide heating or cooling are also contemplated and included within the scope of the present disclosure. Illustrative other components may include, but are not limited to, steering wheel heating or cooling devices, shift knob heating or cooling devices, and/or the like.

In various embodiments, the system 102 may be particularly arranged such that various components are fluidly coupled to one another (indicated by the long dash lines), various components are electrically coupled (indicated by the solid lines), and are contained within a coolant flow loop (indicated by the short dashed lines). In addition, the system 102 may be arranged such the thermoelectric cooler 115 is fluidly positioned downstream from various other components, such as the charger 130, the air conditioning system 135, and the radiator 140.

The fluid within the components that are fluidly coupled to one another may generally be any fluid, and is not limited by the present disclosure. In particular embodiments, the fluid may be air. The coolant within the coolant flow loop is likewise not limited by the present disclosure, and may be any coolant that is commonly understood as being used for heat transfer. Illustrative examples of coolant may include, but are not limited to, water, air, hydrogen gas, helium gas, carbon dioxide, sulfur hexafluoride, ethylene glycol, diethylene glycol, propylene glycol, Freon®, or the like.

With respect to fluid coupling, the blower 150 may be fluidly coupled to and upstream from the air conditioning system 135 and the radiator 140 such that fluid flows from the blower 150 to the air conditioning system 135 and/or the radiator 140, as described in greater detail herein. In addition, the auxiliary blower 145 may be fluidly coupled to and upstream from the charger 130 such that fluid flows from the auxiliary blower 145 to the charger 130. The charger 130, the air conditioning system 135, and the radiator 140 may each, individually, be fluidly coupled to and upstream from the vehicle cabin 105 such that fluid flowing from the charger 130, the air conditioning system 135, and the radiator 140, respectively, may flow into the vehicle cabin 105. One or more of the bypass valves 180 (e.g., a first bypass valve 180*a*, a second bypass valve 180*b*, a third bypass valve 180*c*, and a fourth bypass valve 180*d*) may be positioned between the charger 130 and the vehicle cabin 105, the air conditioning system 135 and the vehicle cabin 105, and/or the radiator 140 and the vehicle cabin 105 so as to control the flow of fluid between the components. For example, one or more of the bypass valves 180 may redirect fluid flow from the charger 130, the air conditioning system 135, and/or the radiator 140 such that the fluid flows to the thermoelectric cooler 115 instead of (or in addition to) the vehicle cabin 105, as described in greater detail herein. The radiator 140 may further be fluidly coupled to and positioned upstream from the thermoelectric generator 120. The fourth bypass valve 180*d* may be fluidly coupled at a fluid output of the radiator 140 so as to control the direction of fluid flow from the radiator 140 to the thermoelectric cooler 115 and/or the thermoelectric generator 120, as described in greater detail herein. The thermoelectric cooler 115, in addition to being fluidly coupled to and downstream from the charger 130, the air conditioning system 135 and/or the radiator 140, may also be fluidly coupled to and upstream from the vehicle cabin 105 such that fluid can flow from the thermoelectric cooler 115 to the vehicle cabin 105. The system 102 may further include one or more exhaust locations for exhausting excess fluid. For example, an exhaust may exist at the first bypass valve 180*a* to exhaust excess fluid from the charger 130. In another example, an exhaust may exist as a fluid output from the thermoelectric generator 120 to exhaust excess fluid from the thermoelectric generator 120.

Fluid coupling may be achieved by any component, device, or means that allows fluid to flow therethrough such that the fluid is directed between the components described herein. Illustrative examples of components that may be used for fluid coupling include, but are not limited to, conduit, ducts, pipes, and/or the like.

With respect to the electrical coupling, the energy storage device 125 may be electrically coupled to one or more components to provide electrical energy to the one or more components. For example, the energy storage device 125 may be electrically coupled to (and provide electrical energy to) one or more of the thermoelectric cooler 115, the air conditioning system 135, the auxiliary blower 145, the blower 150, the autonomous or semiautonomous system GPU 160, the electric drive motor 165, and the one or more electric vehicle power electronics modules 170 (or alternatively, the integrated motor drive system 168 as described herein with respect to FIG. 2). Still referring to FIG. 1, the energy storage device 125 may also be electrically coupled to one or more components that provide electrical energy to the energy storage device 125. For example, the energy storage device 125 may be electrically coupled to (and receive electrical energy from) one or more of the thermoelectric generator 120 and the charger 130.

Electrical coupling may be achieved by any component, device, or means that allows for electrical energy to be transferred between the components described herein. Illustrative examples of components that may be used for electrical coupling include, but are not limited to, electrical wires or the like.

With respect to the coolant flow loop, coolant may flow between a plurality of components described herein to effect heat transfer. Heat transfer using coolant should be generally understood and is not described in greater detail herein. Examples of components through which coolant may flow include, but are not limited to, the coolant reservoir 175, the pump 155, the radiator 140, the autonomous or semiautonomous system GPU 160, the electric drive motor 165, and the one or more electric vehicle power electronics modules 170 (or alternatively, the integrated motor drive system 168 as described herein with respect to FIG. 2). Still referring to FIG. 1, the coolant may flow through any component, device, or means that allows for coolant flow and that is at least partially constructed of a thermally conductive material. Illustrative examples of components that may be used for coolant flow include, but are not limited to, conduit, ducts, pipes, and/or the like.

The system 102 may operate to heat or cool the vehicle 100 in different ways that are dependent on whether heating or cooling is desired or selected by a user, an ambient temperature inside and outside the vehicle 100, and how the vehicle 100 is being operated (i.e., in an autonomous/semiautonomous driving mode, a parking mode, a charging mode, or the like). Illustrative examples of the various heating/cooling modes and driving/parking/charging modes are described hereinbelow with respect to FIGS. 3-14, but it should be understood that such examples are not exhaustive.

Figure 3:
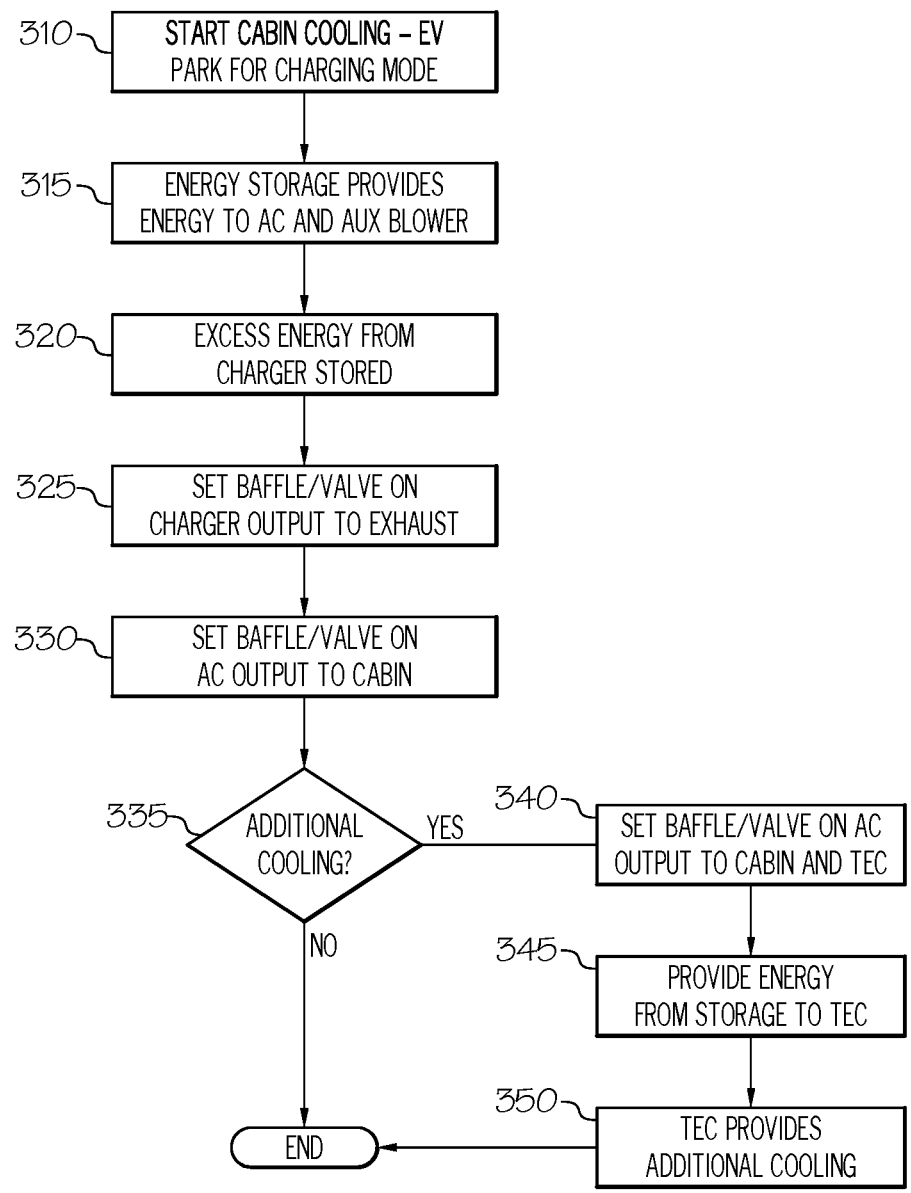
FIG. 3 depicts a flow diagram of an illustrative method of providing cooling to a vehicle cabin of an autonomous or semiautonomous electric vehicle when the vehicle is parked and charging according to one or more embodiments shown and described herein.
Figure 4:
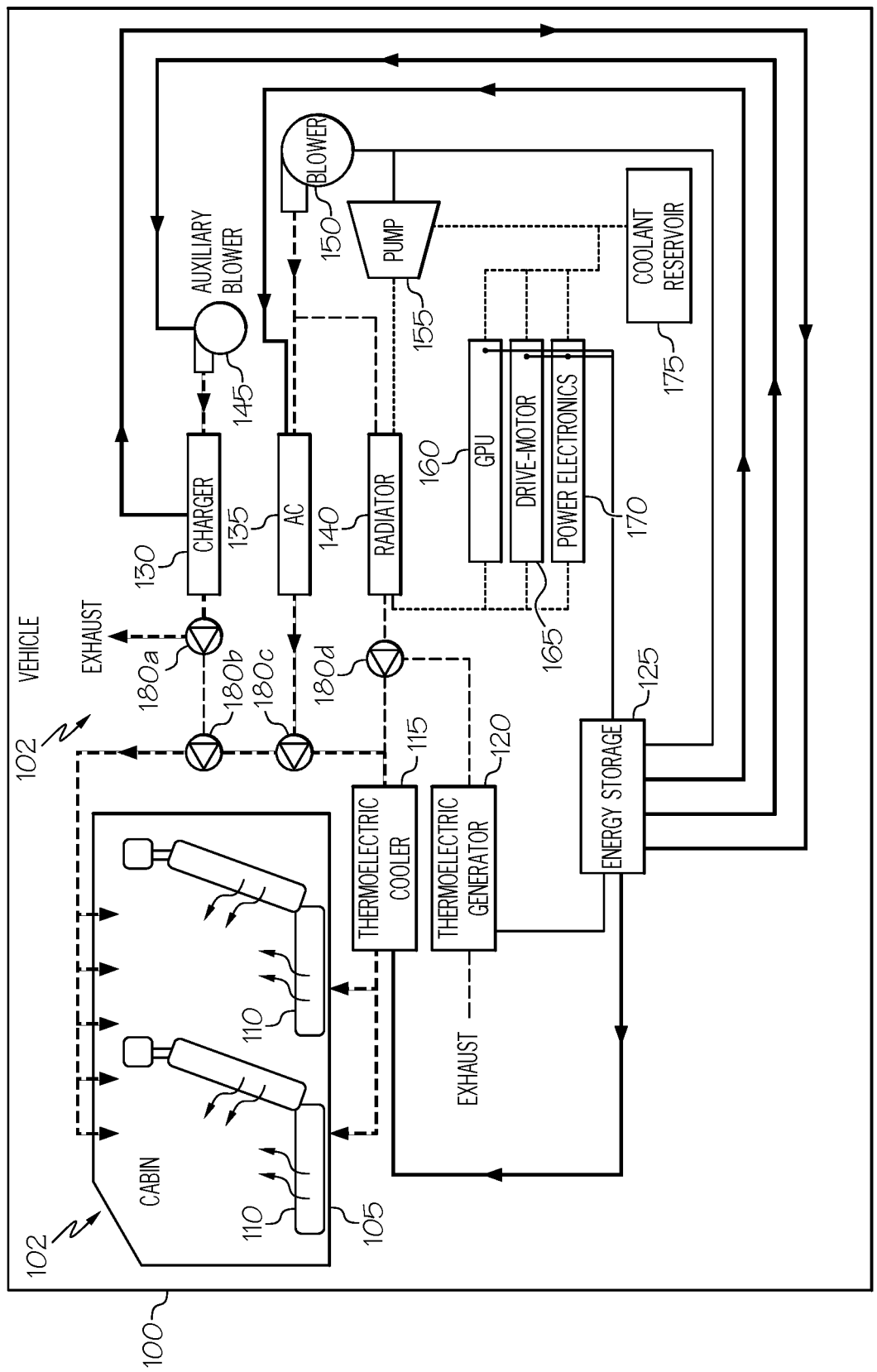
FIG. 4 schematically depicts an illustrative system providing cooling to a vehicle cabin of an autonomous or semiautonomous electric vehicle when the vehicle is parked and charging according to one or more embodiments shown and described herein.

FIG. 3 depicts a flow chart of one such method of operation of the system 102, which is also schematically depicted in FIG. 4. More specifically, FIGS. 3 and 4 relate to a method of operating the system 102 in which cooling is provided to the vehicle cabin 105 when the vehicle 100 is parked and charging. Referring to FIGS. 3 and 4, the cabin cooling-EV park for charging mode may be started at step 310. This may occur, for example, when the system 102 or a component thereof senses that the vehicle 100 is in park, the charger 130 is operating to charge the vehicle 100 (i.e., transferring electrical energy to the energy storage device 125), and the vehicle cabin 105 is to be cooled (e.g., because a user within the vehicle cabin 105 has selected a cooling function on an HVAC control device, powered on a cooled seat, or the like).

At step 315, the energy storage device 125 may provide electrical energy to the air conditioning system 135 and the auxiliary blower 145. As such, the air conditioning system 135 cools air that is provided thereto.

At step 320, energy from the charger 130 is directed to the energy storage device 125. Since operation of the charger 130 may generate heat and the heat is not needed for the vehicle cabin 105, the auxiliary blower 145 may blow heated air from the charger 130 and the first bypass valve 180*a* may be positioned such that the heated air is exhausted at step 325, as indicated by the heavy dashed line extending from the first bypass valve 180*a*.

Cooled air moving out of the air conditioning system 135 may be directed to the vehicle cabin 105 and, in some embodiments, may be further cooled by the thermoelectric cooler 115. As such, as indicated by the heavy dashed lines exiting the air conditioning system 135, the third bypass valve 180*c* is set at step 330 such that cooled air is directed by the third bypass valve 180*c* into the vehicle cabin 105. It should be understood that, unless explicitly stated otherwise herein, any air (whether cooled or heated), when directed to the vehicle cabin 105 is directed to one or more vents, ports, or the like within the vehicle cabin 105 and/or to the one or more seat heating or cooling components 110, as described in greater detail herein.

A determination is made at step 335 as to whether additional cooling is necessary. That is, if the air conditioning system 135 is unable to provide sufficiently cooled air to the vehicle cabin 105, at least a portion of the air exiting the air conditioning system 135 may be directed through the thermoelectric cooler 115 before being supplied to the vehicle cabin 105. Additional cooling may be necessary, for example, if a user selects a desired air temperature that is lower than the minimum cooling that is achievable by the air conditioning system 135, very low temperatures are needed to quickly cool a hot vehicle cabin 105, and/or the like. If additional cooling is necessary, the third bypass valve 180*c* may be set at step 340 to direct at least a portion of the air exiting the air conditioning system 135 into the thermoelectric cooler 115, as indicated by the heavy dashed line between the air conditioning system 135 and the thermoelectric cooler 115. Electricity from the energy storage device 125 is also provided to the thermoelectric cooler 115 at step 345 such that it can operate to cool the air received from the air conditioning system 135 at step 350.

Figure 5:
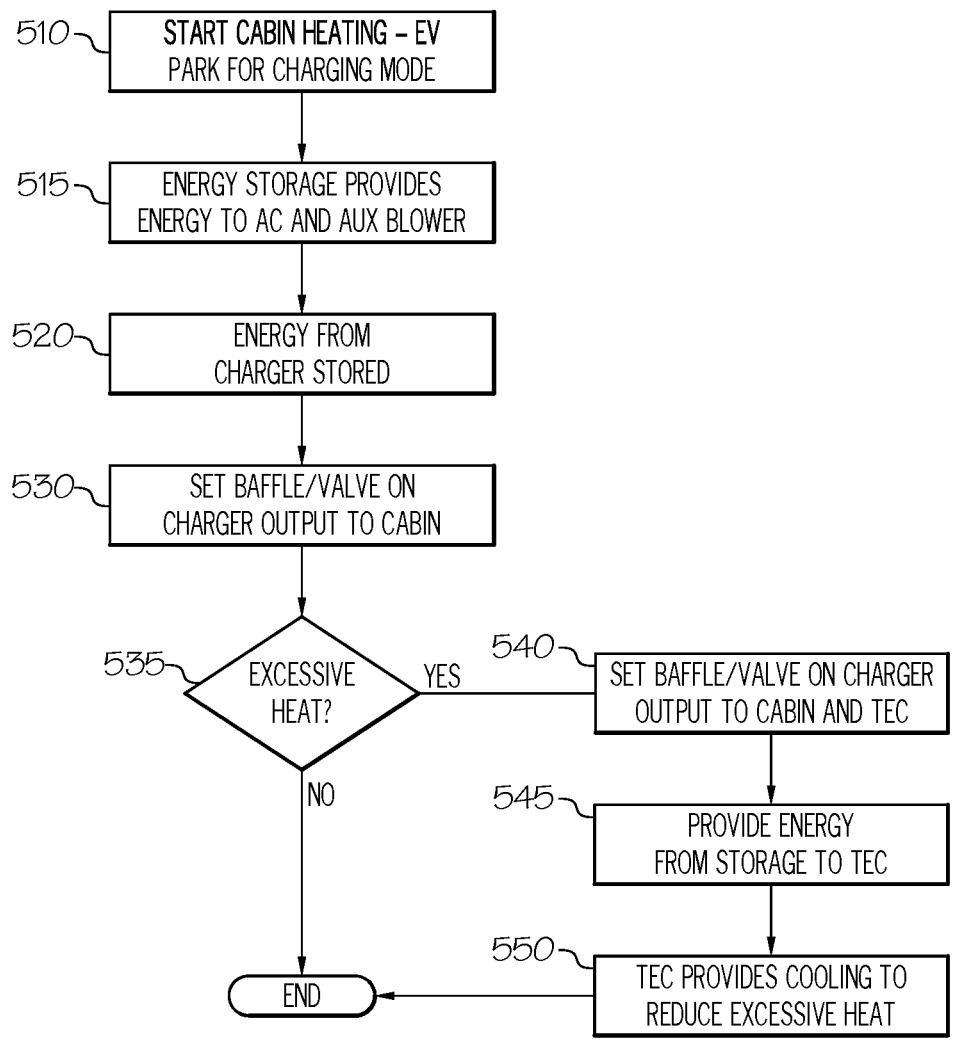
FIG. 5 depicts a flow diagram of an illustrative method of providing heating to a vehicle cabin of an autonomous or semiautonomous electric vehicle when the vehicle is parked and charging according to one or more embodiments shown and described herein.
Figure 6:
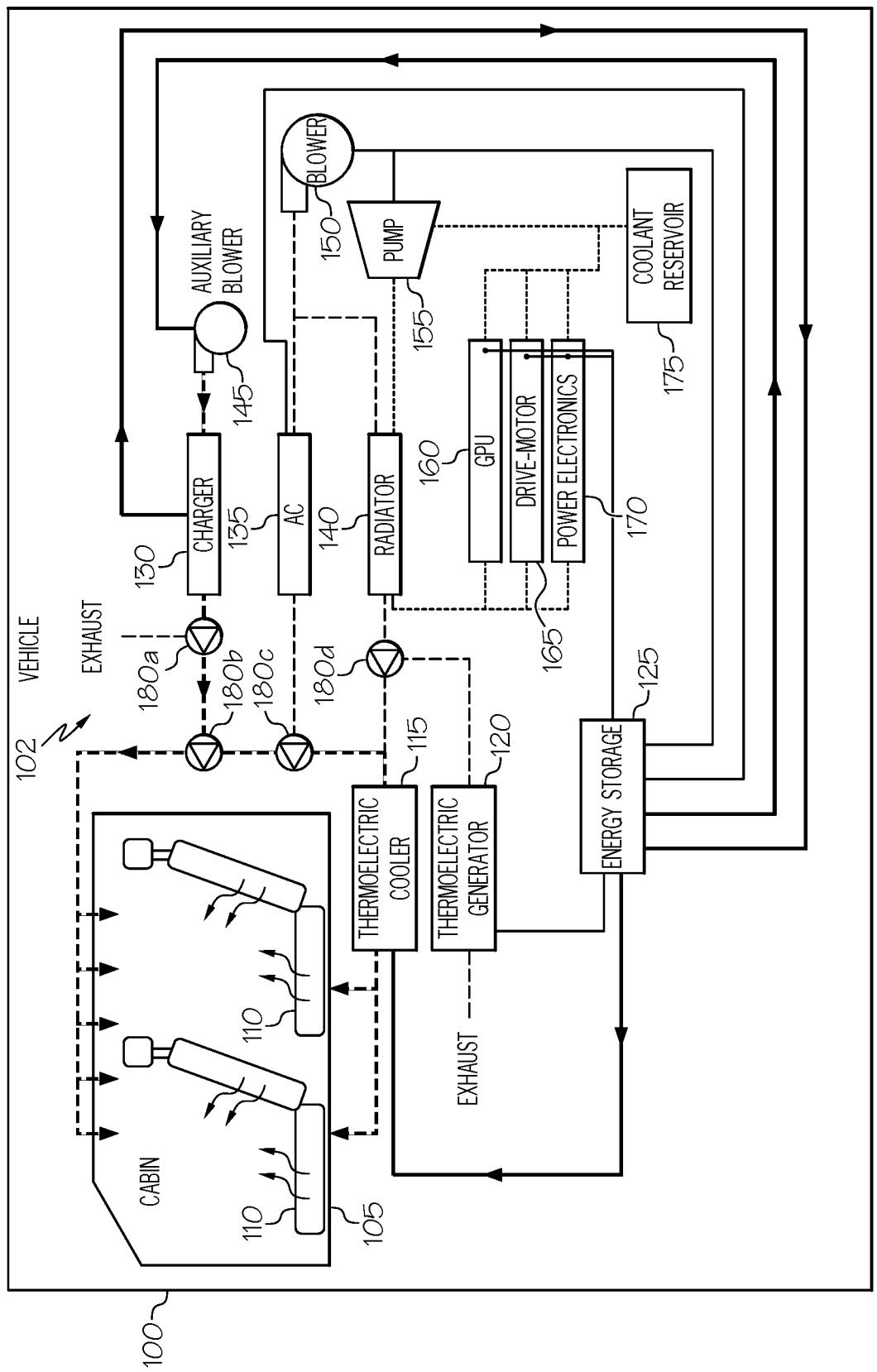
FIG. 6 schematically depicts an illustrative system providing heating to a vehicle cabin of an autonomous or semiautonomous electric vehicle when the vehicle is parked and charging according to one or more embodiments shown and described herein.

FIG. 5 depicts a flow chart of another method of operation of the system 102, which is also schematically depicted in FIG. 6. More specifically, FIGS. 5 and 6 relate to a method of operating the system 102 in which heating is provided to the vehicle cabin 105 when the vehicle 100 is parked and charging. Referring to FIGS. 5 and 6, the cabin heating-EV park for charging mode may be started at step 510. This may occur, for example, when the system 102 or a component thereof senses that the vehicle 100 is in park, the charger 130 is operating to charge the vehicle 100, and the vehicle cabin 105 is to be heated (e.g., because a user within the vehicle cabin 105 has selected a heating function on an HVAC control device, powered on a heated seat, or the like).

At step 515, the energy storage device 125 may provide electrical energy to the auxiliary blower 145. As such, the auxiliary blower 145 may be powered on to blow air to the charger 130 and/or blow heated air out of the charger 130.

At step 520, energy from the charger 130 is directed to the energy storage device 125. Since operation of the charger 130 may generate heat and the heat is needed for the vehicle cabin 105, the auxiliary blower 145 may blow heated air from the charger 130 and the first bypass valve 180a may be positioned such that the heated air is directed to the vehicle cabin 105 at step 530, as indicated by the heavy dashed line extending from the first bypass valve 180a.

In some embodiments, the air blown out of the charger 130 may be too hot and thus may be cooled by the thermoelectric cooler 115. As such, a determination is made at step 535 as to whether additional cooling is necessary. That is, if the charger 130 provides excessively heated air to the vehicle cabin 105, at least a portion of the air exiting the charger 130 may be directed through the thermoelectric cooler 115 before being supplied to the vehicle cabin 105. Cooling of the excessively heated air may be necessary, for example, if a user selects a desired air temperature that is lower than the amount of heat that is generated by the charger 130 or the like. If cooling is necessary, the second bypass valve 180b may be set at step 540 to direct at least a portion of the air exiting the charger 130 into the thermoelectric cooler 115, as indicated by the heavy dashed line between the first bypass valve 180a and the thermoelectric cooler 115. Electricity from the energy storage device 125 is also provided to the thermoelectric cooler 115 at step 545 such that the thermoelectric cooler 115 can operate to cool the excessively heated air received from the charger 130 at step 550.

Figure 7:
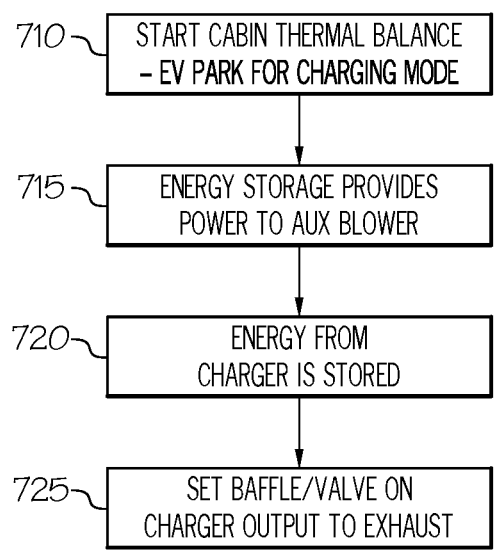
FIG. 7 depicts a flow diagram of an illustrative method of maintaining a thermal balance within a vehicle cabin when heating or cooling is not needed when the vehicle is parked and charging according to one or more embodiments shown and described herein.
Figure 8:
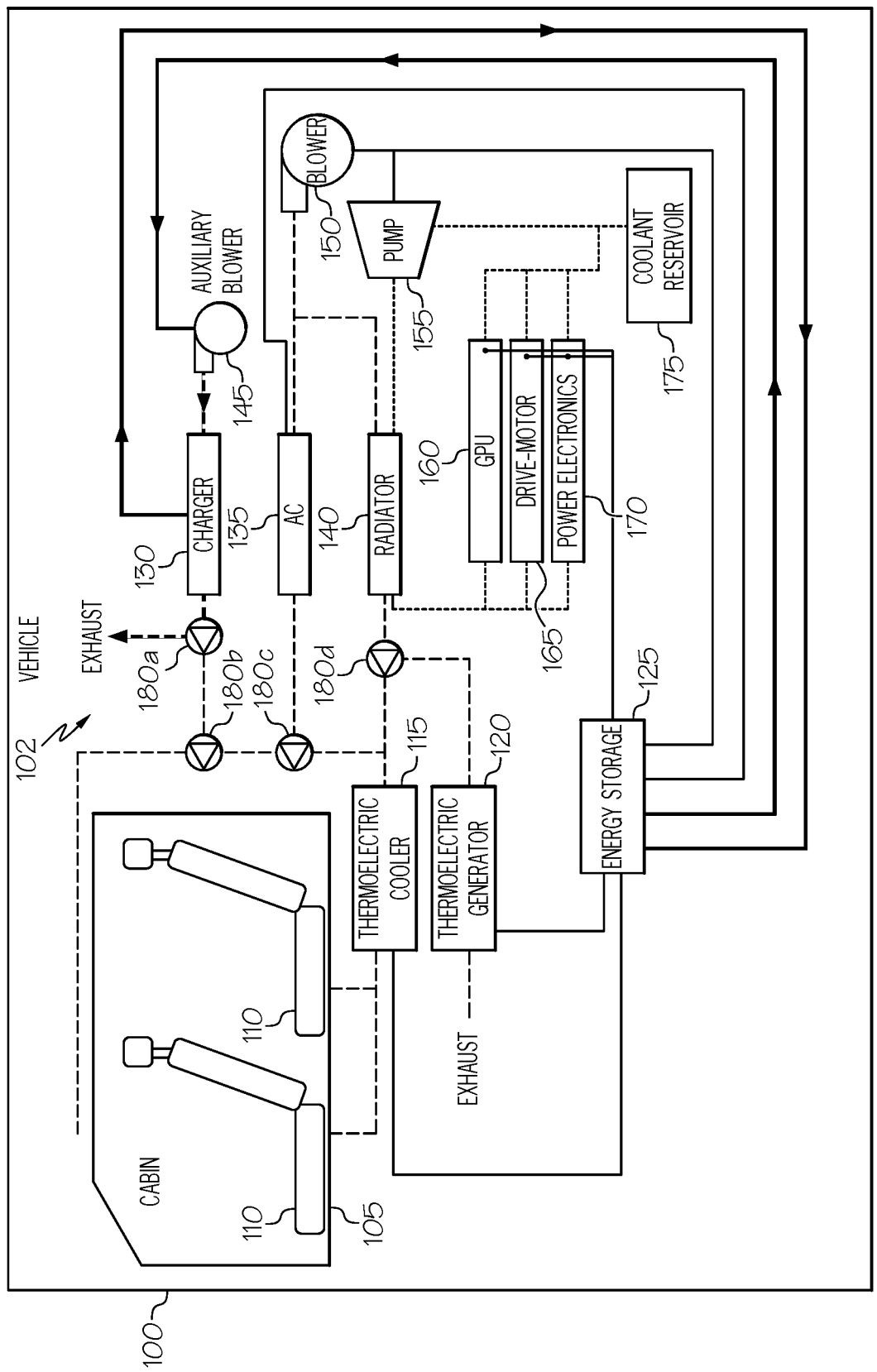
FIG. 8 schematically depicts an illustrative system maintaining a thermal balance within a vehicle cabin when heating or cooling is not needed when the vehicle is parked and charging according to one or more embodiments shown and described herein.

FIG. 7 depicts a flow chart of yet another method of operation of the system 102, which is also schematically depicted in FIG. 8. More specifically, FIGS. 7 and 8 relate to a method of operating the system 102 in which neither heating nor cooling is provided to the vehicle cabin 105 when the vehicle 100 is parked and charging. Referring to FIGS. 7 and 8, the cabin thermal balance-EV park for charging mode may be started at step 710. This may occur, for example, when the system 102 or a component thereof senses that the vehicle 100 is in park, the charger 130 is operating to charge the vehicle 100, and the vehicle cabin 105 need not be heated or cooled (e.g., because a user within the vehicle cabin 105 has shut off the HVAC system, the vehicle cabin 105 is unoccupied, or the like).

At step 715, the energy storage device 125 may provide electrical energy to the auxiliary blower 145. As such, the auxiliary blower 145 may be powered on to blow air to the charger 130 and/or blow heated air out of the charger 130.

At step 720, energy from the charger 130 is directed to the energy storage device 125. Since operation of the charger 130 may generate heat and the heat is not needed for the vehicle cabin 105, the auxiliary blower 145 may blow heated air from the charger 130 and the first bypass valve 180a may be positioned such that the heated air is exhausted at step 725, as indicated by the heavy dashed line extending from the first bypass valve 180a.

Figure 9:
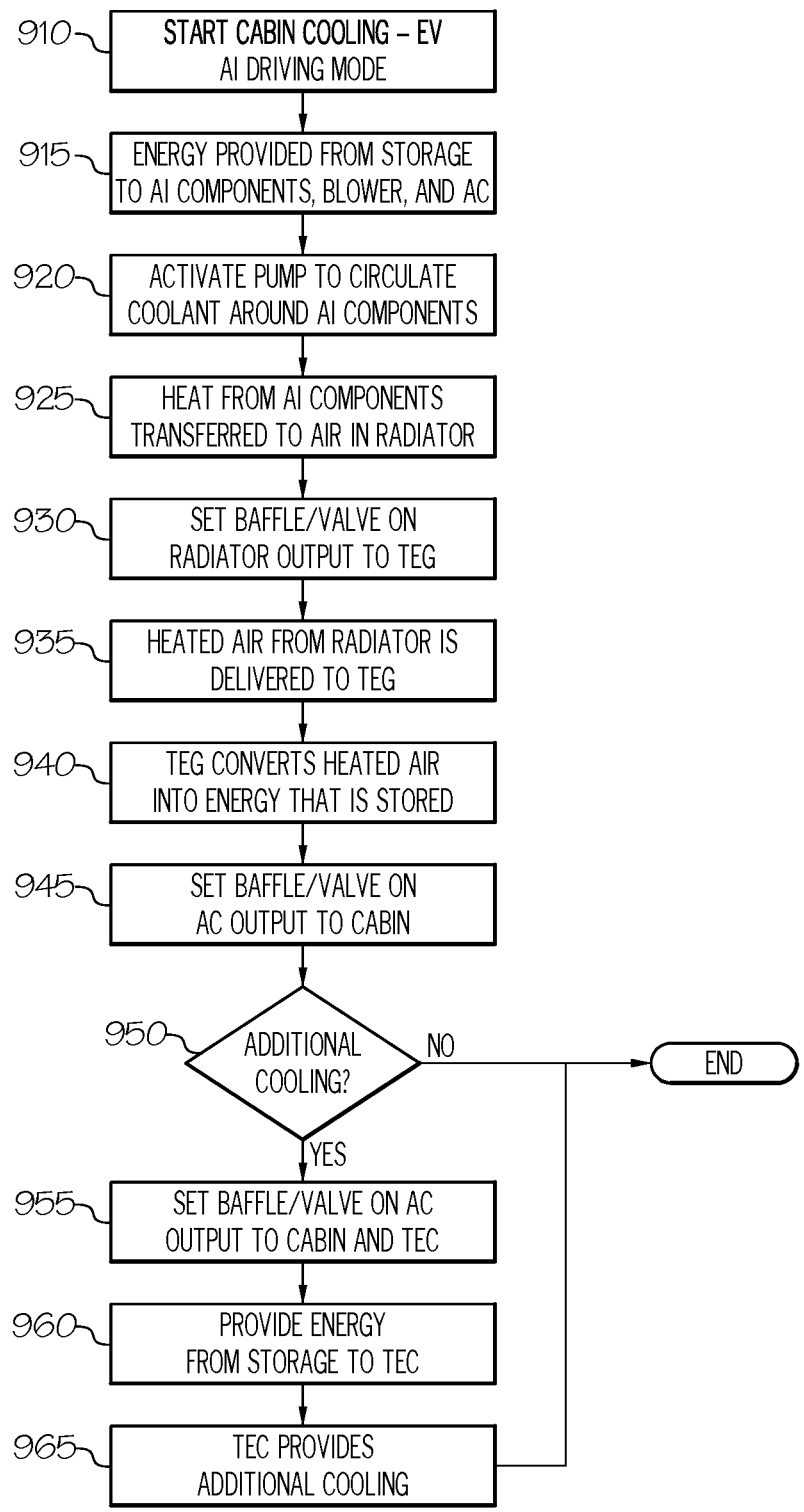
FIG. 9 depicts a flow diagram of an illustrative method of providing cooling to a vehicle cabin of an autonomous or semiautonomous vehicle when the vehicle is operating an autonomous or semiautonomous driving mode according to one or more embodiments shown and described herein.
Figure 10:
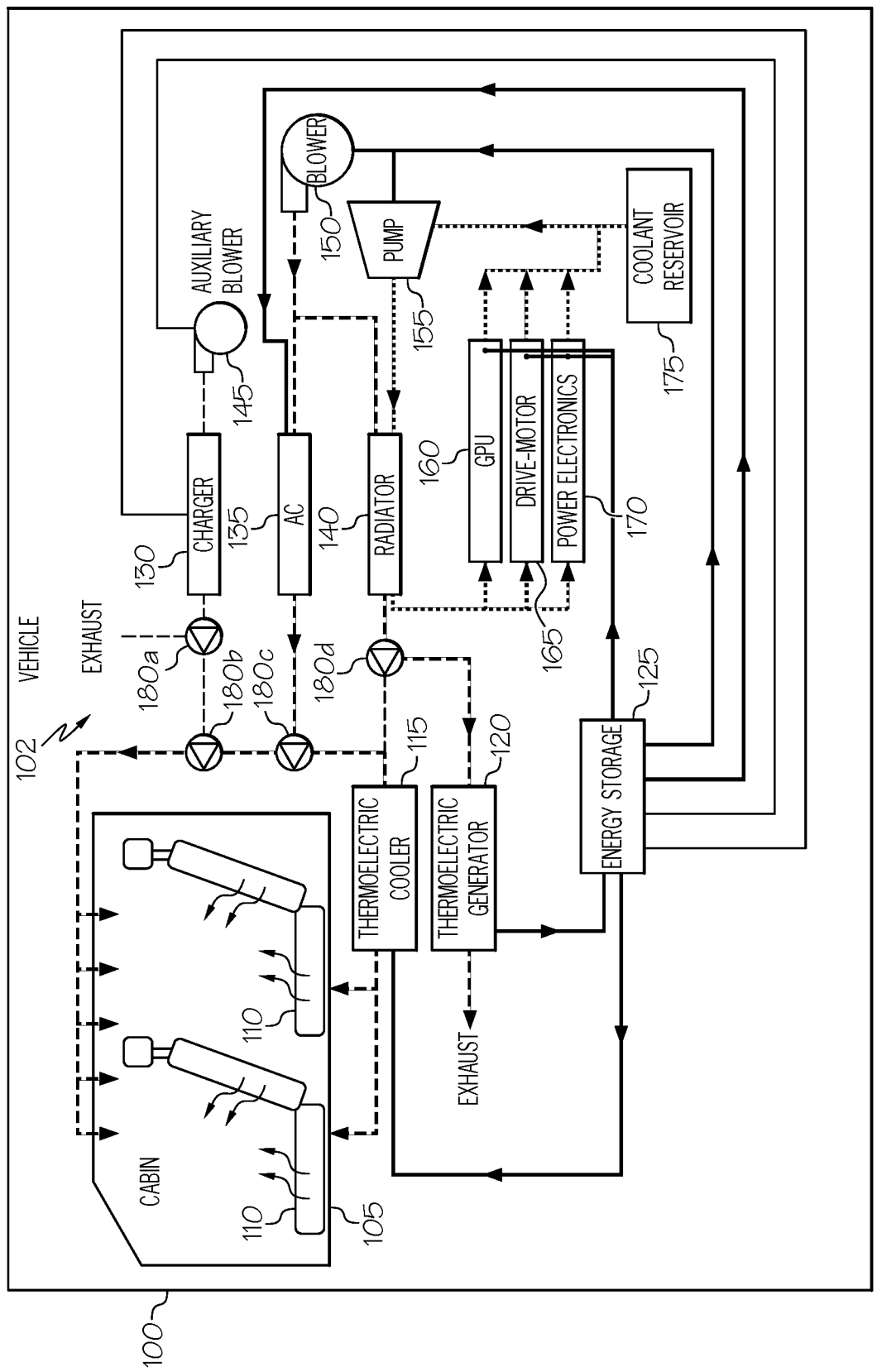
FIG. 10 schematically depicts an illustrative system providing cooling to a vehicle cabin of an autonomous or semiautonomous vehicle when the vehicle is operating an autonomous or semiautonomous driving mode according to one or more embodiments shown and described herein.

FIG. 9 depicts a flow chart of another method of operation of the system 102, which is also schematically depicted in FIG. 10. More specifically, FIGS. 9 and 10 relate to a method of operating the system 102 in which cooling is provided to the vehicle cabin 105 when the vehicle 100 is in an autonomous or semiautonomous driving mode. If the vehicle is not being operated in an autonomous or semiautonomous mode (e.g., a human driver is manning all aspects of the vehicle), the processes described with respect to FIGS. 9 and 10 may not be used. Referring to FIGS. 9 and 10, the cabin cooling-EV AI driving mode may be started at step 910. This may occur, for example, when the system 102 or component thereof senses that the vehicle 100 is in an autonomous or semiautonomous driving mode and the vehicle cabin 105 is to be cooled (e.g., because a user within the vehicle cabin 105 has selected a cooling function on an HVAC control device, powered on a cooled seat, or the like).

The various systems that power the vehicle 100 and provide the vehicle 100 with autonomous or semiautonomous functions may be powered on in this mode. As such, at step 915, the energy storage device 125 may provide electricity to the various vehicle components, including, for example, the autonomous or semiautonomous system GPU 160, the electric drive motor 165, and the one or more electric vehicle power electronics modules 170 (or alternatively, the integrated motor drive system 168 as described herein with respect to FIG. 2). In addition to the various vehicle components, the energy storage device 125 may further provide electricity to the blower 150 and the air conditioning system 135 such that cool air is delivered to the vehicle cabin 105, as described herein.

To ensure that the various vehicle components described above do not become overheated due to operation (i.e., to avoid heat related damage to the various vehicle components), coolant is circulated through the coolant loop that is in contact with the various vehicle components, as described herein. As such, the pump 155 may be activated at step 920 such that the pump 155 circulates coolant around the various vehicle components. Accordingly, power may be supplied from the energy storage device 125 to the pump 155.

As a result of coolant circulation through the coolant loop, the heat from the various vehicle components may be transferred to the coolant, which is then circulated to the radiator 140. The radiator 140 transfers the heat from the coolant to air such that the coolant is cooled and can be recirculated back to the various vehicle components for additional cooling, as indicated at step 925. The air heated by the radiator 140 is directed accordingly such that the heat is appropriately utilized and/or to prevent damage to various components. As such, the fourth bypass valve 180d may be positioned at step 930 such that the heated air from the radiator 140 is directed to the thermoelectric generator 120 at step 935. This is indicated by the heavy dashed line between the radiator 140 and the thermoelectric generator 120.

At step 940, the thermoelectric generator 120 converts the heated air into electrical energy that is transmitted to and stored in the energy storage device 125. The thermoelectric generator 120 may convert the heated air into electrical energy using the Seebeck effect, as described herein.

To ensure that the air that is cooled by the air conditioning system 135 and blown by the blower 150 is appropriately directed to the vehicle cabin 105, the third bypass valve 180c may be positioned at step 945. More specifically, the third bypass valve 180c may be positioned such that the cooled air is directed to the vehicle cabin 105, as indicated by the heavy dashed line between the air conditioning system 135 and the vehicle cabin 105.

A determination is made at step 950 as to whether additional cooling is necessary. That is, if the air conditioning system 135 is unable to provide sufficiently cooled air to the vehicle cabin 105, at least a portion of the air exiting the air conditioning system 135 may be directed through the thermoelectric cooler 115 before being supplied to the vehicle cabin 105. Additional cooling may be necessary, for example, if a user selects a desired air temperature that is lower than the minimum cooling that is achievable by the air conditioning system 135, very low temperatures are needed to quickly cool a hot vehicle cabin 105, and/or the like. If additional cooling is necessary, the third bypass valve 180c may be positioned at step 955 to direct at least a portion of the air exiting the air conditioning system 135 into the thermoelectric cooler 115, as indicated by the heavy dashed line between the air conditioning system 135 and the thermoelectric cooler 115. Electricity from the energy storage device 125 is also provided to the thermoelectric cooler 115 at step 960 such that it can operate to cool the air received from the air conditioning system 135 at step 965.

Figure 11:
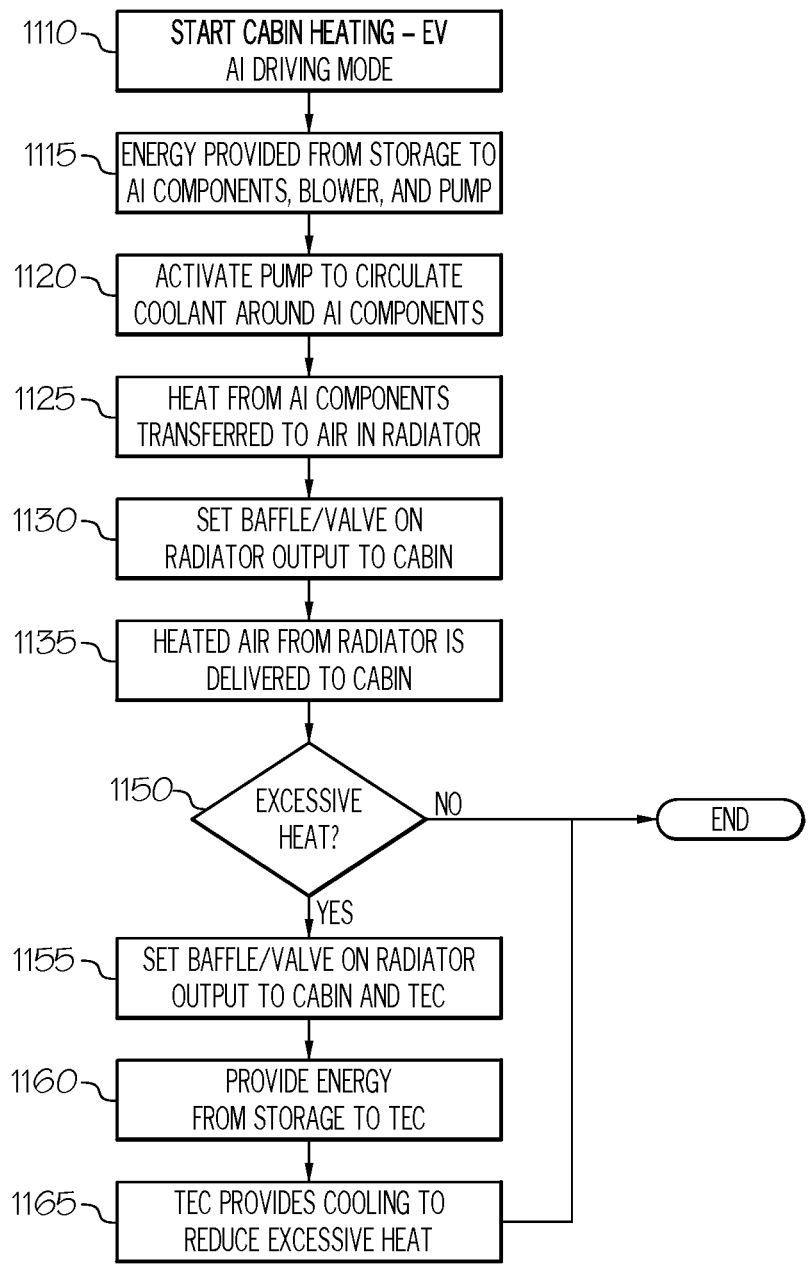
FIG. 11 depicts a flow diagram of an illustrative method of providing heating to a vehicle cabin of an autonomous or semiautonomous vehicle when the vehicle is operating an autonomous or semiautonomous driving mode according to one or more embodiments shown and described herein.
Figure 12:
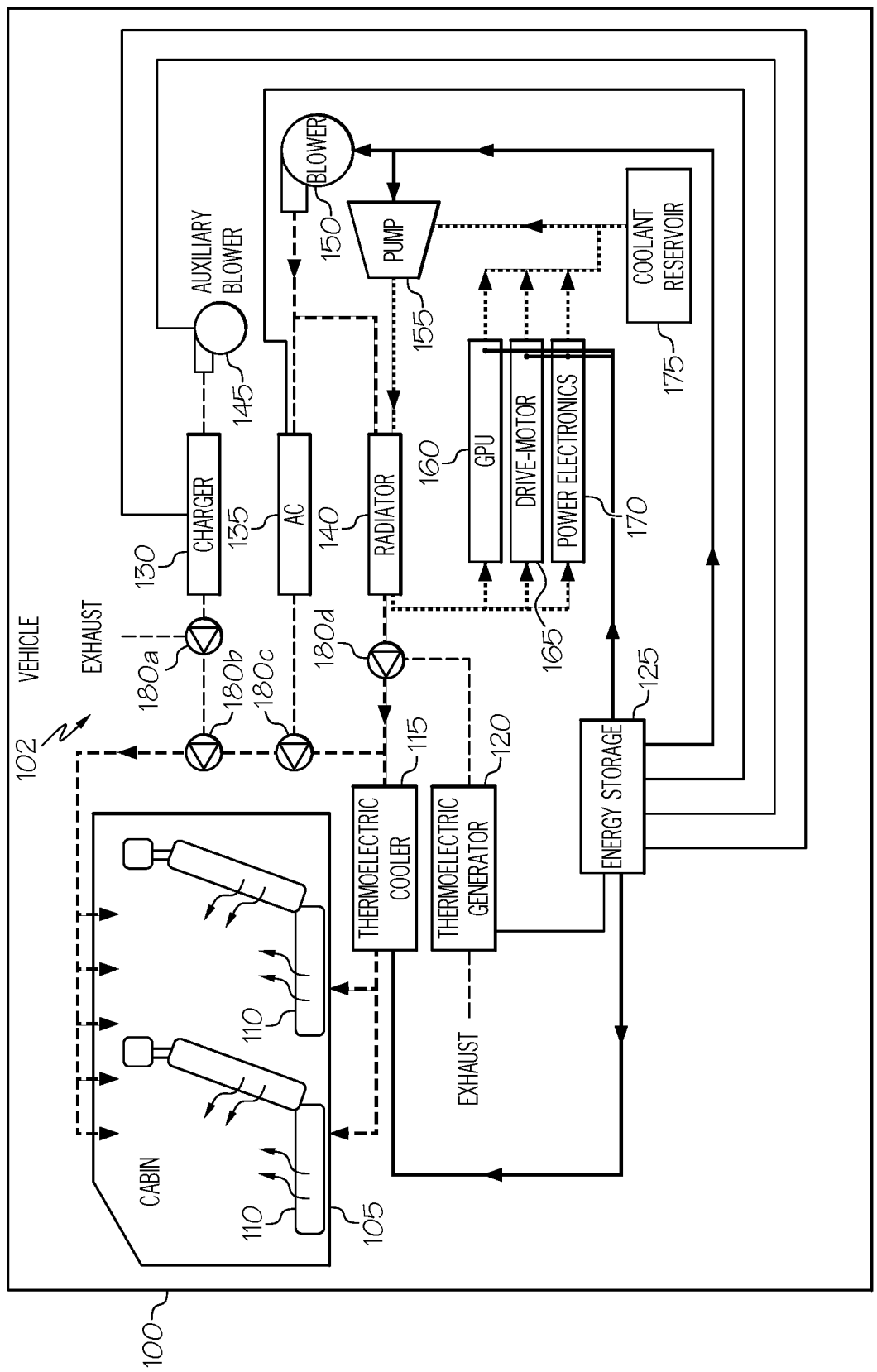
FIG. 12 schematically depicts an illustrative system providing heating to a vehicle cabin of an autonomous or semiautonomous vehicle when the vehicle is operating an autonomous or semiautonomous driving mode according to one or more embodiments shown and described herein.

FIG. 11 depicts a flow chart of another method of operation of the system 102, which is also schematically depicted in FIG. 12. More specifically, FIGS. 11 and 12 relate to a method of operating the system 102 in which heating is provided to the vehicle cabin 105 when the vehicle 100 is in an autonomous or semiautonomous driving mode. That is, FIGS. 11 and 12 do not relate to a method of operating the system 102 when the vehicle 100 is fully manned by a human driver without any assistance from autonomous or semiautonomous systems. Referring to FIGS. 11 and 12, the cabin heating-EV AI driving mode may be started at step 1110. This may occur, for example, when the system 102 or component thereof senses that the vehicle 100 is in an autonomous or semiautonomous driving mode and the vehicle cabin 105 is to be heated (e.g., because a user within the vehicle cabin 105 has selected a heating function on an HVAC control device, powered on a heated seat, or the like).

The various systems that power the vehicle 100 and provide the vehicle 100 with autonomous or semiautonomous functions may be powered on in this mode. As such, at step 1115, the energy storage device 125 may provide electricity to the various vehicle components, including, for example, the autonomous or semiautonomous system GPU 160, the electric drive motor 165, and the one or more electric vehicle power electronics modules 170 (or alternatively, the integrated motor drive system 168 as described herein with respect to FIG. 2). In addition to the various vehicle components, the energy storage device 125 may further provide electricity to the blower 150 and the pump 155 such that warmed air is delivered to the vehicle cabin 105, as described herein.

To ensure that the various vehicle components described above do not become overheated due to operation (i.e., to avoid heat related damage to the various vehicle components), coolant is circulated through the coolant loop that is in contact with the various vehicle components, as described herein. As such, the pump 155 may be activated at step 1120 such that the pump 155 circulates coolant around the various vehicle components. Accordingly, power may be supplied from the energy storage device 125 to the pump 155 (as described above with respect to step 1115).

As a result of coolant circulation through the coolant loop, the heat from the various vehicle components may be transferred to the coolant, which is then circulated to the radiator 140. The radiator 140 transfers the heat from the coolant to air such that the coolant is cooled and can be recirculated back to the various vehicle components for additional cooling, as indicated at step 1125. The air heated by the radiator 140 is directed accordingly such that the heat is appropriately utilized and/or to prevent damage to various components. As such, the third bypass valve 180c and the fourth bypass valve 180d may be positioned at step 1130 such that the heated air from the radiator 140 is directed to the vehicle cabin 105 at step 1135. This is indicated by the heavy dashed line between the radiator 140 and the vehicle cabin 105 by way of the third bypass valve 180c and the fourth bypass valve 180d.

In some embodiments, the air blown out of the radiator 140 may be too hot and thus may be cooled by the thermoelectric cooler 115. As such, a determination is made at step 1150 as to whether the heated air from the radiator 140 is excessive. That is, if the radiator 140 provides excessively heated air to the vehicle cabin 105, at least a portion of the air exiting the radiator 140 may be directed through the thermoelectric cooler 115 before being supplied to the vehicle cabin 105. Cooling of the excessively heated air may be necessary, for example, if a user selects a desired air temperature that is lower than the amount of heat that is generated by the radiator 140 or the like. If cooling is necessary, the third bypass valve 180c may be set at step 1155 to direct at least a portion of the air exiting the radiator 140 into the thermoelectric cooler 115, as indicated by the heavy dashed line between the radiator 140 and the thermoelectric cooler 115 by way of the third bypass valve 180c and the fourth bypass valve 180d. Electricity from the energy storage device 125 is also provided to the thermoelectric cooler 115 at step 1160 such that the thermoelectric cooler 115 can operate to cool the excessively heated air received from the radiator 140 at step 1165.

Figure 13:
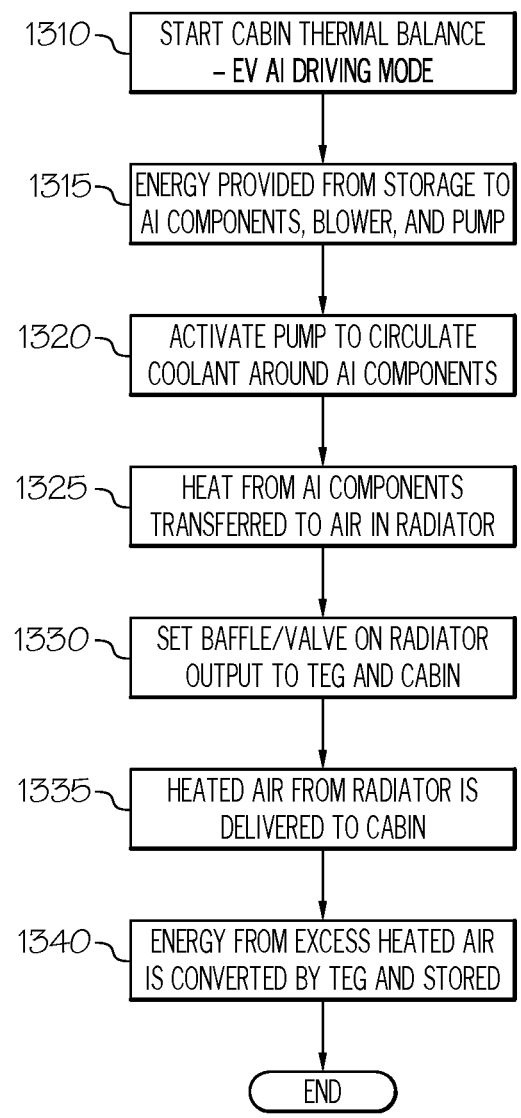
FIG. 13 depicts a flow diagram of an illustrative method of maintaining a thermal balance within a vehicle cabin when heating or cooling is not needed when the vehicle is operating an autonomous or semiautonomous driving mode according to one or more embodiments shown and described herein.
Figure 14:
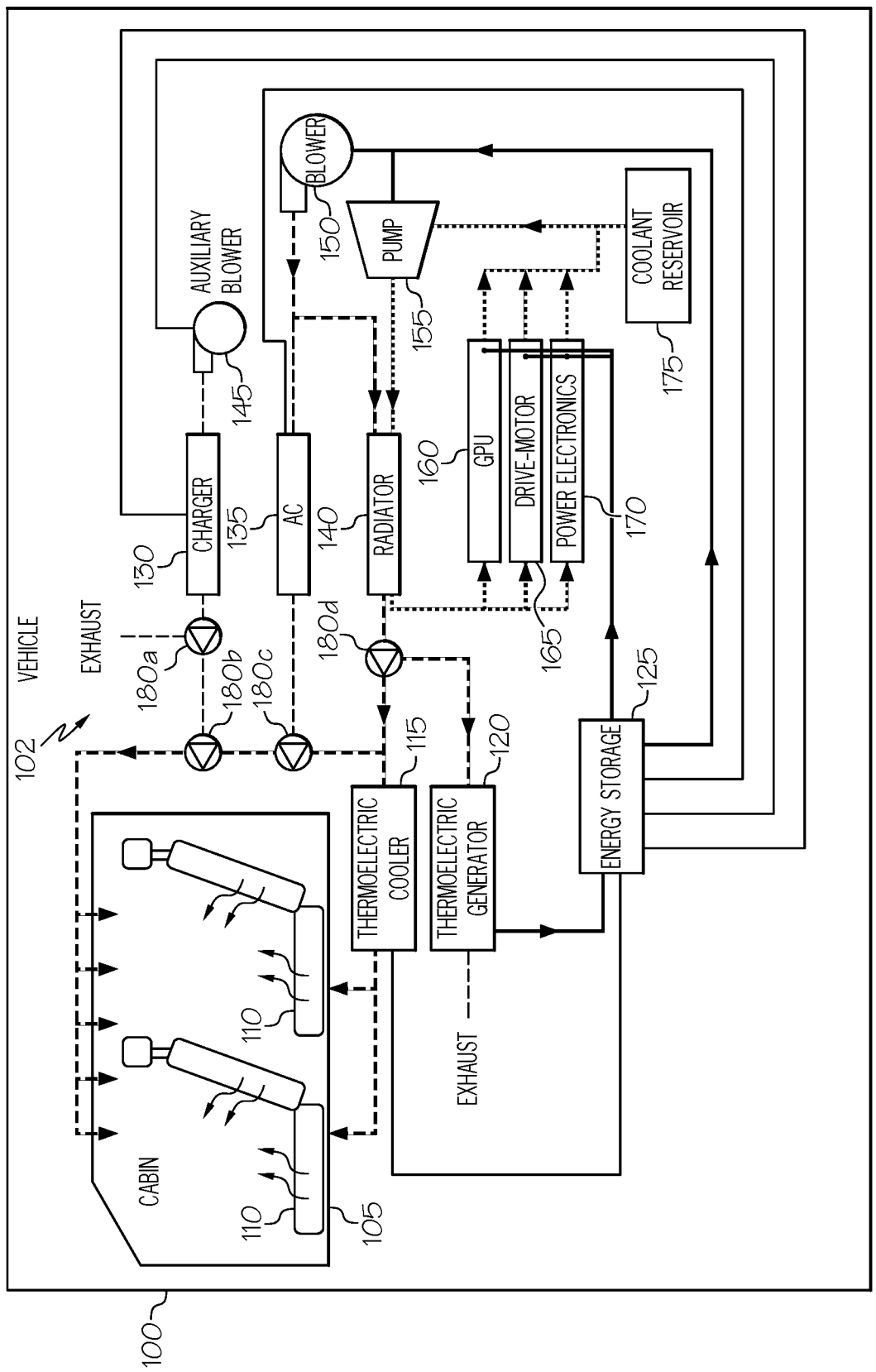
FIG. 14 schematically depicts an illustrative system maintaining a thermal balance within a vehicle cabin when heating or cooling is not needed when the vehicle is operating an autonomous or semiautonomous driving mode according to one or more embodiments shown and described herein.

FIG. 13 depicts a flow chart of another method of operation of the system 102, which is also schematically depicted in FIG. 14. More specifically, FIGS. 13 and 14 relate to a method of operating the system 102 in which neither heating nor cooling is provided to the vehicle cabin 105 when the vehicle 100 is in an autonomous or semiautonomous driving mode. Referring to FIGS. 13 and 14, the cabin thermal balance-EV AI driving mode may be started at step 1310. This may occur, for example, when the system 102 or component thereof senses that the vehicle 100 is in an autonomous or semiautonomous driving mode and the vehicle cabin 105 need not be heated or cooled (e.g., because a user within the vehicle cabin 105 has shut off the HVAC system or the like).

The various systems that power the vehicle 100 and provide the vehicle 100 with autonomous or semiautonomous functions are powered on in this mode. As such, at step 1315, the energy storage device 125 may provide electricity to the various vehicle components, including, for example, the autonomous or semiautonomous system GPU 160, the electric drive motor 165, and the one or more electric vehicle power electronics modules 170 (or alternatively, the integrated motor drive system 168 as described herein with respect to FIG. 2). In addition to the various vehicle components, the energy storage device 125 may further provide electricity to the blower 150 and the pump 155 such that the radiator 140 appropriately functions to cool the various vehicle components, as described herein.

To ensure that the various vehicle components described above do not become overheated due to operation (i.e., to avoid heat related damage to the various vehicle components), coolant is circulated through the coolant loop that is in contact with the various vehicle components, as described herein. As such, the pump 155 may be activated at step 1320 such that the pump 155 circulates coolant around the various vehicle components. Accordingly, power may be supplied from the energy storage device 125 to the pump 155 (as described above with respect to step 1315).

As a result of coolant circulation through the coolant loop, the heat from the various vehicle components may be transferred to the coolant, which is then circulated to the radiator 140. The radiator 140 transfers the heat from the coolant to air such that the coolant is cooled and can be recirculated back to the various vehicle components for additional cooling, as indicated at step 1325. The air heated by the radiator 140 is directed accordingly such that the heat is appropriately utilized and/or to prevent damage to various components. As such, the third bypass valve 180*c* and the fourth bypass valve 180*d* may be positioned at step 1330 such that the heated air from the radiator 140 is directed to the thermoelectric generator 120 and/or the vehicle cabin 105 at step 1335. This is indicated by the heavy dashed lines between the radiator 140 and the thermoelectric generator 120 and the vehicle cabin 105 by way of the third bypass valve 180*c* and the fourth bypass valve 180*d*. Heated air may be supplied to the vehicle cabin 105 only to the extent that it is needed to maintain a thermal balance within the cabin (i.e., not cause the cabin temperature to rise or drop). The remaining heated air is supplied to the thermoelectric generator 120 such that the thermoelectric generator 120 converts the heated air to electrical energy, which is then supplied and stored by the energy storage device 125 at step 1340.

It should now be understood that the systems and methods described herein may provide heating and/or cooling to a vehicle cabin of an autonomous or semiautonomous electric vehicle in such a way so as to reduce the number of components necessary to achieve heating and/or cooling and to increase the efficiency of heating or cooling. Such systems and methods generally include positioning a thermoelectric cooler and/or a thermoelectric generator downstream from various vehicle heating or cooling sources, but upstream from the vehicle cabin. As a result, air delivered to the vehicle cabin can first be passed through the thermoelectric cooler to further cool the air when necessary and energy from excess heated air can be recovered by the thermoelectric generator as electrical energy.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A vehicle system, the vehicle system comprising:
    one or more autonomous or semiautonomous vehicle components generating thermal energy as a byproduct of operation;
    a radiator fluidly coupled to the one or more vehicle components and positioned downstream from the one or more vehicle components such that the radiator receives at least a portion of the thermal energy;
    a thermoelectric generator thermally coupled to and located downstream from the radiator; and
    one or more bypass valves that control fluid flow from the radiator such that fluid flows directly to a cabin of a vehicle or flows into the thermoelectric generator.

2. The vehicle system of claim 1, wherein:
    the thermoelectric generator generates electrical energy from excess thermal energy delivered in the fluid from the radiator; and
    the electrical energy is stored in an energy storage device.

3. The vehicle system of claim 1, further comprising:
    a charger fluidly coupled to the cabin of the vehicle and positioned upstream from the cabin via the one or more bypass valves.

4. The vehicle system of claim 1, further comprising:
    an auxiliary blower fluidly coupled to the charger and positioned upstream from the charger, the auxiliary blower facilitating fluid flow from the charger to the cabin.

5. The vehicle system of claim 1, wherein:
    at least one of the one or more autonomous or semiautonomous vehicle components comprises an autonomous drive graphics processing unit; and
    one or more of a drive motor and an electric vehicle power electronics device generate additional thermal energy as a byproduct of operation, the additional thermal energy received by the radiator.

6. The vehicle system of claim 1, wherein at least one of the one or more autonomous or semiautonomous vehicle components is an integrated motor drive system.

7. The vehicle system of claim 1, further comprising:
    a blower fluidly coupled to the radiator and positioned upstream from the radiator, the blower facilitating fluid flow from the radiator to the cabin or the thermoelectric generator.

8. The vehicle system of claim 1, further comprising:
    an air conditioning system fluidly coupled to the cabin via the one or more bypass valves and positioned upstream from the cabin such that fluid flowing from the air conditioning system flows directly into the cabin.

9. A system in an autonomous or semiautonomous vehicle, the system comprising:
    one or more autonomous or semiautonomous vehicle components generating thermal energy as a byproduct of operation;
    a radiator fluidly coupled to the one or more vehicle components and positioned downstream from the one or more vehicle components such that the radiator receives at least a portion of the thermal energy;
    a thermoelectric generator fluidly coupled to the radiator and positioned downstream from the radiator, the thermoelectric generator generating electrical energy from excess thermal energy delivered in fluid from the radiator;
    an energy storage device electrically coupled to the one or more vehicle components and the thermoelectric generator, wherein the energy storage device stores the electrical energy generated by the thermoelectric generator and supplies the electrical energy to the one or more vehicle components; and
    one or more bypass valves that control fluid flow from the radiator such that the fluid flows directly to a cabin of the vehicle or flows into the thermoelectric generator.

10. The system of claim 9, wherein the one or more bypass valves control the fluid flow from the radiator such that the fluid flows:
   directly into the cabin, or
   into the thermoelectric generator.

11. The system of claim 9, wherein:
   at least one of the one or more vehicle components comprises an autonomous drive graphics processing unit; and
   one or more of a drive motor and an electric vehicle power electronics device generate additional thermal energy as a byproduct of operation, the additional thermal energy received by the radiator.

12. The system of claim 9, wherein at least one of the one or more vehicle components is an integrated motor drive system.

13. The system of claim 9, further comprising:
   a blower fluidly coupled to the radiator and positioned upstream from the radiator, the blower facilitating fluid flow from the radiator to the cabin or the thermoelectric generator.

14. The system of claim 9, further comprising:
   an air conditioning system fluidly coupled to the cabin via the one or more bypass valves and positioned upstream from the cabin such that fluid flowing from the air conditioning system flows directly into the cabin.

15. The system of claim 9, further comprising:
   a charger electrically coupled to the energy storage device and fluidly coupled to the cabin and positioned upstream from the cabin via the one or more bypass valves, wherein the charger provides additional electrical energy to the energy storage device.

16. An autonomous or semiautonomous electric vehicle comprising:
   a system comprising:
      one or more autonomous or semiautonomous electric vehicle components generating thermal energy as a byproduct of operation;
      a radiator fluidly coupled to the one or more electric vehicle components and positioned downstream from the one or more electric vehicle components such that the radiator receives at least a portion of the thermal energy;
      a thermoelectric generator thermally coupled to and located downstream from the radiator; and
      one or more bypass valves that control fluid flow from the radiator such that fluid flows directly to a cabin of a vehicle or flows into the thermoelectric generator.

17. The vehicle of claim 16, wherein the system further comprises a charger fluidly coupled to the cabin of the vehicle and positioned upstream from the cabin via the one or more bypass valves, wherein the one or more bypass valves control the fluid flow from the charger such that the fluid flows directly to the cabin.

18. The vehicle of claim 16, wherein at least one of the one or more electric vehicle components comprises an autonomous drive graphics processing unit.

19. The vehicle of claim 16, wherein at least one of the one or more electric vehicle components is an integrated motor drive system.

20. The vehicle of claim 16, wherein the system further comprises an air conditioning system fluidly coupled to the cabin via the one or more bypass valves and positioned upstream from the cabin such that fluid flowing from the air conditioning system flows directly into the cabin.

* * * * *